United States Patent [19]
Seki et al.

[11] Patent Number: 5,151,864
[45] Date of Patent: Sep. 29, 1992

[54] METHOD OF GENERATING CUTTING PASSES OF COMPLEX CURVED SURFACE

[75] Inventors: Masaki Seki, Tokyo; Koji Samukawa; Osamu Hanaoka, both of Yamanashi, all of Japan

[73] Assignee: Fanuc Ltd., Yamanashi, Japan

[21] Appl. No.: 460,069

[22] PCT Filed: May 22, 1989

[86] PCT No.: PCT/JP89/00508
§ 371 Date: Jan. 31, 1990
§ 102(e) Date: Jan. 31, 1990

[87] PCT Pub. No.: WO89/12265
PCT Pub. Date: Dec. 14, 1989

[30] Foreign Application Priority Data
May 31, 1988 [JP] Japan .................. 63-133245

[51] Int. Cl.$^5$ .................................. G05B 19/18
[52] U.S. Cl. ..................... 364/474.23; 364/474.29
[58] Field of Search .............. 364/474.23, 474.24, 364/474.25, 474.28, 474.29, 474.31, 191

[56] References Cited
U.S. PATENT DOCUMENTS

| | | |
|---|---|---|
| 4,491,906 | 1/1985 | Kishi et al. .................. 364/474.31 |
| 4,589,062 | 5/1986 | Kishi et al. .................. 364/474.25 |
| 4,618,924 | 10/1986 | Hinds ......................... 364/474.25 |
| 4,825,377 | 4/1989 | Seki et al. ................... 364/474.29 |
| 4,837,703 | 6/1989 | Kakazu et al. ............... 364/474.25 |
| 4,855,921 | 8/1989 | Seki et al. ................... 364/474.29 |

Primary Examiner—Jerry Smith
Assistant Examiner—Patrick D. Muir
Attorney, Agent, or Firm—Staas & Halsey

[57] ABSTRACT

A complex curved surface (SS) is divided into a plurality of areas (ARj), a vertical relationship regarding a plurality of curved surfaces (SSi) present only in each of the areas is specified for every area, the vertical relationship conforming to an area (ARj) in which there exists a line of intersection (CLk) that is a projection of a cutting pass on an X-Y plane is used to obtain cutting passes (Pak) of the complex curved surface in this area (ARj), and the cutting passes of the complex curved surface are generated by combining the cutting passes of all areas (ARj).

10 Claims, 5 Drawing Sheets

METHOD OF GENERATING CUTTING PASSES OF COMPLEX CURVED SURFACE

BACKGROUND OF THE INVENTION

1. Field of the Invention

This invention relates to a method of generating cutting passes for a complex curved surface and, more particularly, to a method of generating cutting passes for a complex curved surface using data indicating the vertical relationship of a plurality of curved surfaces constituting a complex curved surface.

2. Description of the Related Art

A curved surface of a three-dimensional metal mold or the like on a design drawing is generally expressed by a plurality of section curves, but no profile data is shown for the shape of the area lying between a section curve and the next adjacent section curve.

In numerically controlled machining, it is essential that machining be carried out so as to smoothly connect these two section curves despite the fact that the profile between them is not given. In other words, this means that machining must be performed by generating the curved surface between the two section curves from such data as that indicative of the section curves, recording on an NC tape the data concerning the generated curved surface, and carrying out machining in accordance with commands from the NC tape. To this end, there has been developed and put into practical use a method comprising generating a plurality of intermediate sections in accordance with predetermined rules from several sections of a three-dimensional curved body from data specifying section curves, finding a section curve (intermediate section curve) on the curved body based on the intermediate sections, and generating a curved surface of the three-dimensional body based on the plurality of generated intermediate section curves. For example, the details are described in U.S. Pat. No. 4,491,906, registered in the U.S. on Jan. 1, 1985, and U.S. Pat. No. 4,589,062, registered in the U.S. on May 5, 1986. This method is useful in generating a smooth curved surface from section data.

Depending upon the type of machining, there are cases where it is necessary to generate a complex curved surface obtained by combining a plurality of three-dimensional curved surfaces. Methods of generating these complex curved surfaces have also been proposed. For example, refer to the specification entitled "Method of Generating Complex Curved Surface" of U.S. Pat. No. 4,855,921, registered in the U.S. on May 18, 1987. In this proposed method of generating cutting passes on a complex curved surface, cutting passes are generated on a complex curved surface by the following steps (a) through (e), described with reference to FIGS. 4 and 5:

(a) Data are entered in advance for specifying three-dimensional curved surfaces, namely a first curved surface SS1, a second curved surface SS2, a third curved surface SS3 and a fourth curved surface SS4 constituting a complex curved surface SS, and the following data are entered for specifying the vertical relationship of these combined surfaces:

| | |
|---|---|
| CUT SS1 | (1) |
| COMP SS2, A | (2) |
| COMP SS3, A | (3) |
| COMP SS4, A | (4) |

In the foregoing, (1) signifies obtaining a cutting pass from the curved surface SS1, (2) signifies obtaining a cutting pass upon transferring to the curved surface SS2 when the Z value becomes larger than that of the curved surface SS1, and (3), (4) similarly signify obtaining cutting passes upon transferring to the curved surfaces SS3, SS4. Further, the alphabetic character "A" is a qualifier which signifies making a transfer when the Z value becomes larger than that of the curved surface defined immediately ahead.

(b) This is followed by entering data specifying one line of intersection CL1 on a predetermined plane (e.g., the X-Y plane), as well as a rule for specifying a number of lines of intersection CLk ($k = 1, 2, \ldots$) on the X-Y plane based on the line of intersection CL1.

(c) Thereafter, section curves 11k, 12k, 13k, 14k (see FIG. 5) are obtained. These are section curves which result when the respective curved surfaces SS1, SS2, SS3, SS4 are cut by a section PLk whose line of intersection with the X-Y plane is a k-th line of intersection CLk among the aforementioned number of lines of intersection.

(d) Of projection points $Pk_1$, $Pk_2$ obtained by projecting a point Pk ($k = 1, 2 \ldots$) on the intersection line CLk onto each of the section curves, one projection point $Pk_2$, decided by the above mentioned vertical relationship data, is taken as a point on a cutting pass Pak (FIG. 4) for cutting the complex curved surface.

(e) Cutting passes of the complex curved surface SS are generated by collecting the cutting passes Pak ($k = 1, 2, \ldots n$) corresponding to the intersection lines CLk ($k = 1, 2, \ldots n$).

There are cases where it is desirable to generate the complex curved surface SS from a cutting pass direction different from that of the cutting pass Pak, e.g., from the direction of a cutting pass Paj in FIG. 4. In such a case, irrespective of the fact that it will suffice merely to know the vertical relationship between two curved surfaces (SS1 and SS3) when obtaining the cutting pass Paj, the vertical relationship between curved surfaces (SS2 and SS4) that have no relation to the cutting pass Paj must also be considered and found based on all of the curved surface vertical-relationship data

| |
|---|
| CUT SS1 |
| COMP SS2, A |
| COMP SS3, A |
| COMP SS4, A |

Consequently, the processing for generating the cutting passes Paj requires a great deal of time.

SUMMARY OF THE INVENTION

Accordingly, an object of the present invention is to provide a method of generating cutting passes of a complex curved surface in which the processing time needed to generate the cutting passes can be reduced.

Another object of the present invention is to provide a method of generating cutting passes of a complex curved surface in which curved surfaces that are unnecessary to consider can be excluded from processing for determining vertical relationship.

A complex curved surface is divided into a plurality of areas, a vertical relationship with respect to a plurality of only those (input) curved surfaces present in each area is specified for every area. The vertical relationship conforms to an area in which there exists a line of intersection that is a projection of a cutting pass on an X-Y plane and is used to obtain (create) cutting passes of the complex curved surface in this area, and the cutting passes of the complex curved surface are generated by combining the cutting passes of all areas.

DESCRIPTION OF THE PREFERRED EMBODIMENTS

Figure 1:
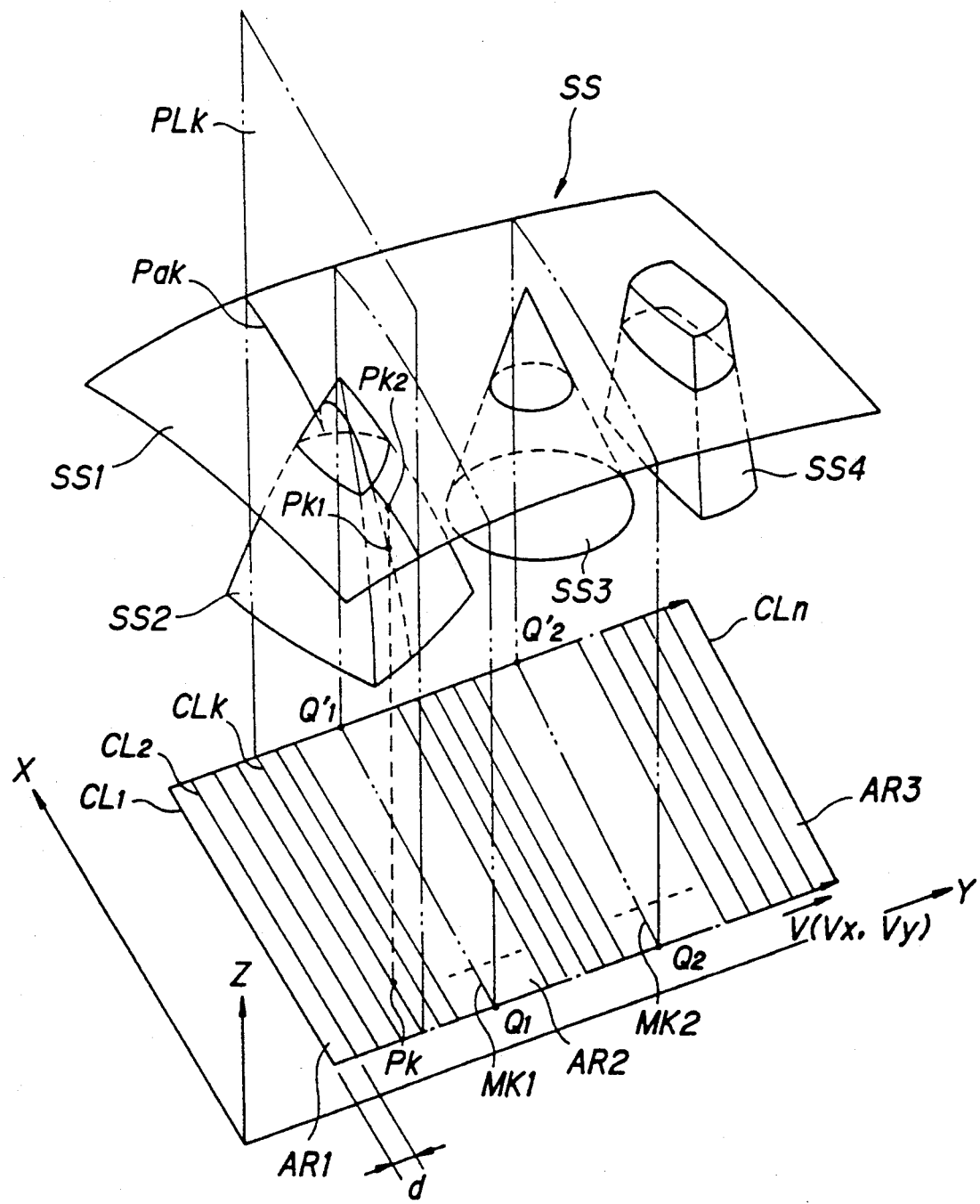
FIG. 1 is a view for describing the general features of the present invention.

FIG. 1 is a view for describing the general features of the present invention, in which SSi (i=1, 2, ... 4) denotes a curved surface constituting a complex curved surface SS, and CLk (k=1, 2, ... 4) represents a cutting pass projected onto an X-Y plane, which is a reference plane. CLk is also the line of intersection between the X-Y plane and a plane PLk. Pak denotes a complex section curve (a cutting pass of the complex curved surface) obtained when the complex curved surface SS is cut by the plane PLk. Areas ARj (j=1, 2, 3) are obtained as a result of partitioning by partitioning lines MK1, MK2.

The complex curved surface SS is divided into a plurality of the areas ARj, a vertical relationship with respect to a plurality of the curved surfaces SSi present in the areas is specified for every area ARj. The vertical relationship conforms to an area ARj in which there exists the line of intersection CLk that is the projection of the cutting pass onto the X-Y plane is used to obtain the cutting passes Pak of the complex curved surface in this area ARj, and the cutting passes of the complex curved surface are generated by combining the cutting passes of all of the areas ARj (j=1, 2, 3).

Figure 2:
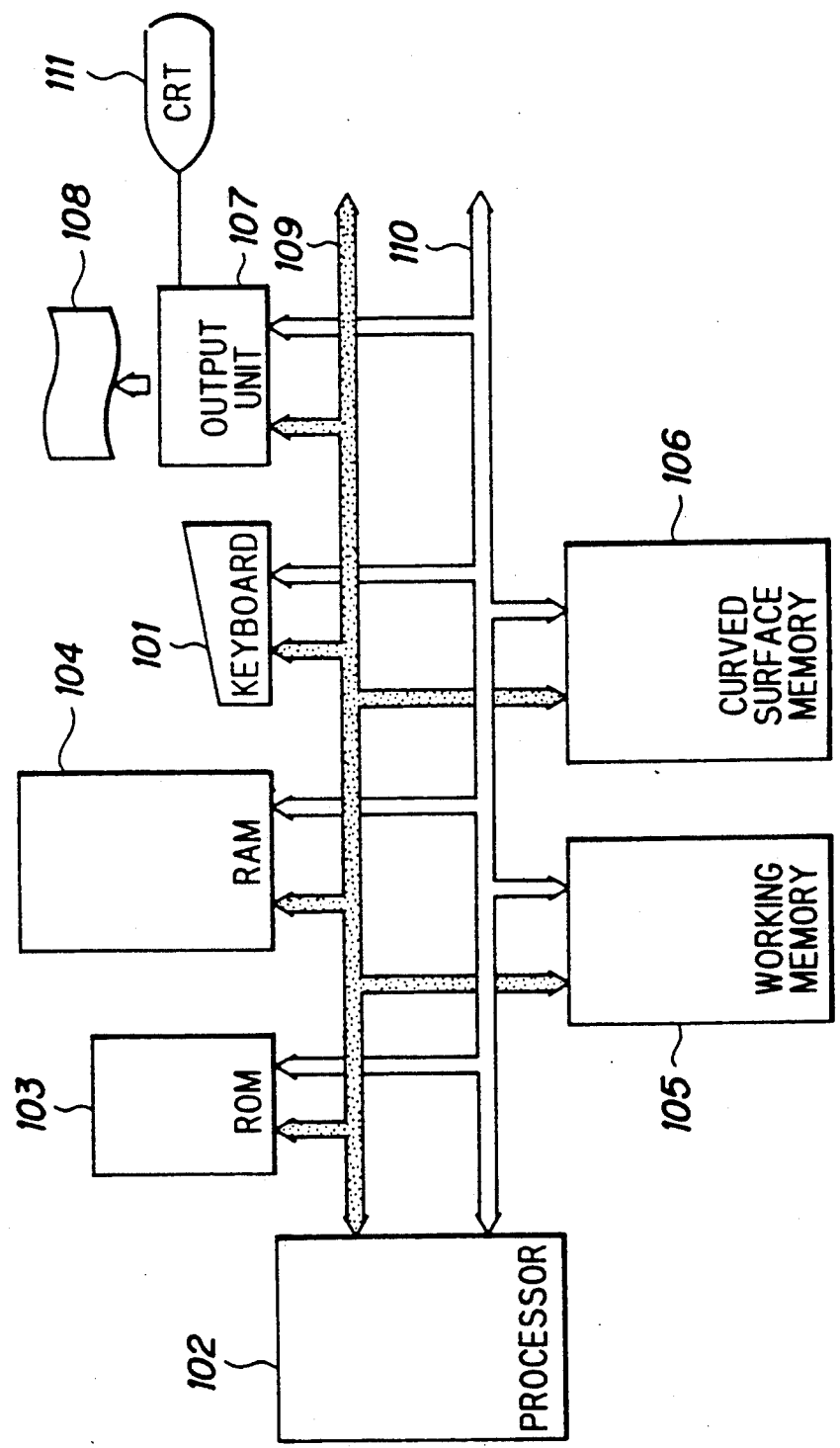
FIG. 2 is a block diagram of an apparatus for realizing the present invention.

FIG. 2 is a block diagram of an automatic programming apparatus for realizing the present invention, in which numeral 101 denotes a keyboard for data input, 102 a processor, 103 a ROM storing a control program, 104 a RAM, and 105 a working memory.

Numeral 106 designates a curved surface memory for storing curved surface data indicative of a generated complex curved surface, as well as NC program data for curved surface machining. 107 denotes an output unit for outputting curved surface data indicative of a generated complex curved surface, as well as NC program data for curved surface machining, to an external storage medium, 108 such as a paper tape or magnetic tape. 109 denotes an address bus, 110 a data bus and 111 a graphic display unit (CRT).

Figure 3:
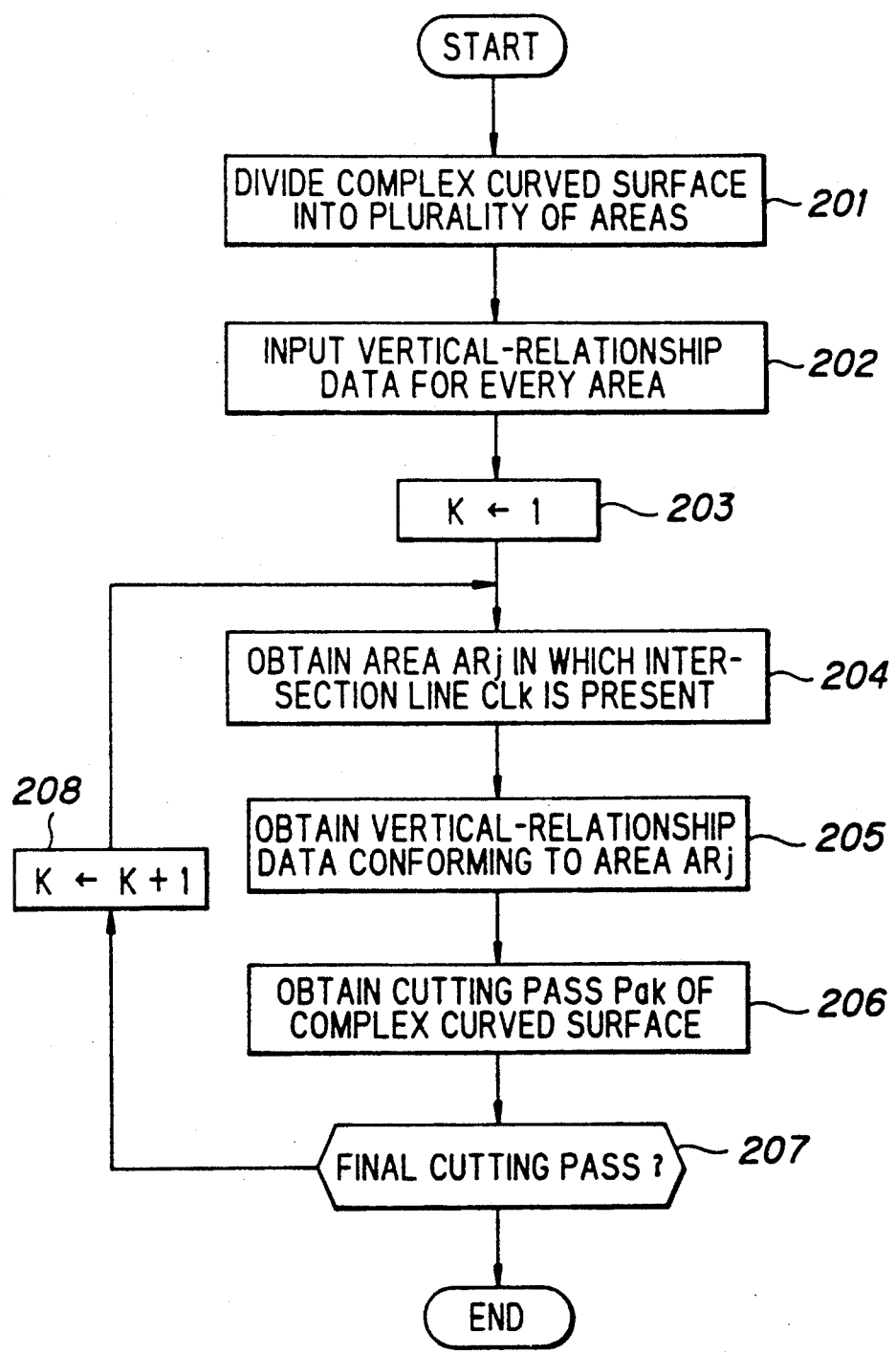
FIG. 3 is a flowchart of processing according to the invention.
Figure 4:
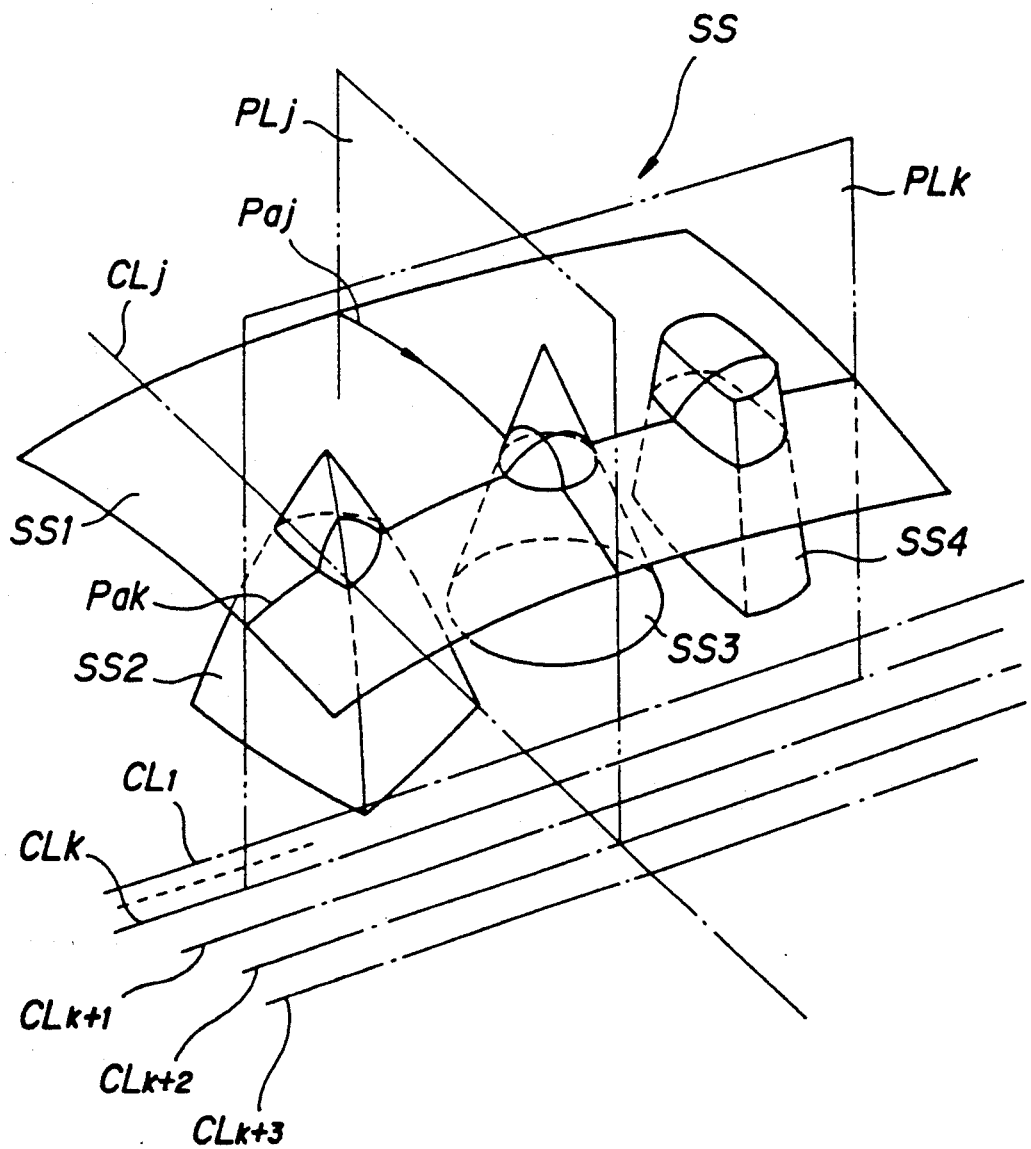
FIGS. 4 and 5 are views for describing a method according to the prior art.
Figure 5:
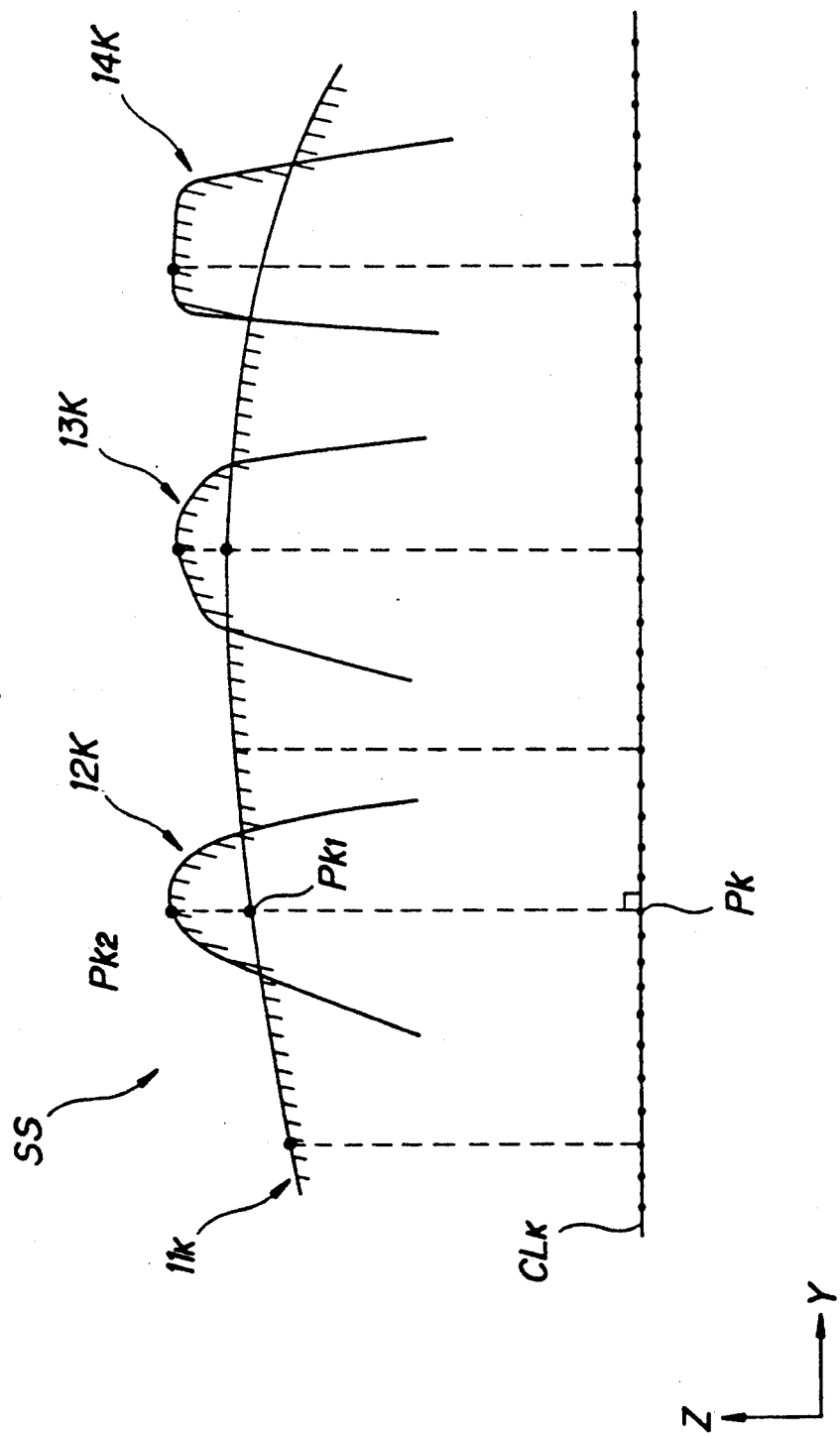

FIG. 3 is a flowchart of the processing of the method of generating cutting passes of a complex curved surface according to the present invention. Processing for generating the cutting passes of the complex curved surface will be described in accordance with the flowchart of FIG. 3. It is assumed that data for specifying three-dimensional curved surfaces, namely the first curved surface SS1, second curved surface SS2, third curved surface SS3 and fourth curved surface SS4 constituting the complex curved surface SS (FIG. 1) have already been entered from the keyboard 101 or the like and stored in the RAM 104.

The operator enters data specifying the line of intersection CL1 on a predetermined plane (e.g., the X-Y plane) as well as a rule for specifying a number of the lines of intersection CLk (k=1, 2 ...) on the X-Y plane based on the line of intersection CL1. For example, a distance d between neighboring lines of intersection and a vector V (Vx, Vy) indicating the range of complex curved surface generation are entered.

Next, data (e.g., coordinates of points Qi, Qi') specifying the partitioning lines MK1, MK2 are entered, whereby the complex curved surface SS is partitioned into the plurality of areas ARj (j=1, 2, 3) (step 201). Data are entered for specifying the vertical relationship of the combined curved surfaces for every area ARj. For example, the vertical relationship $$\text{COM1} = \text{CUT. SS1} \atop \text{COMP. SS2. A} \quad (1)$$

is entered with regard to the first area AR1, the vertical relationship $$\text{COM2} = \text{CUT. SS1} \atop \text{COMP. SS3. A} \quad (2)$$

is entered with regard to the second area AR2, and the vertical relationship $$\text{COM3} = \text{CUT. SS1} \atop \text{COMP. SS4. A} \quad (3)$$

is entered with regard to the third area AR3. In the foregoing, (1) represents data specifying the vertical relationship between the curved surface SS1 and the curved surface SS2 in area AR1 and signifies obtaining a cutting pass from curved surface SS1 and then transferred to curved surface SS2 when the Z value is greater than that of the curved surface SS1. Similarly, (2) represents data specifying the vertical relationship between the curved surface SS1 and the curved surface SS3 in area AR2, and (3) represents data specifying the vertical relationship between the curved surface SS1 and the curved surface SS4 in area AR3 (step 202).

In response to entry of the aforementioned data, the processor 101 performs the following operation (step 203):

$$k \leftarrow 1$$

The processor then obtains the k-th line of intersection CLk among the number of specified lines of intersection and obtains the area ARj (e.g., AR1) in which the line of intersection CLk is present (step 204).

Next, the processor obtains data specifying the vertical relationship corresponding to the obtained area ARj (step 205), and obtains cutting passes of the complex curved surface using the data specifying the vertical relationship obtained. More specifically, in the area AR1, the processor obtains section curves which result when the curved surfaces SS1, SS2 are cut by the section PLk that intersects the X-Y plane at the k-th line of intersection CLk. Of the projected points Pk$_1$, and Pk$_2$ which result when the point Pk on the line of intersection CLk is projected onto each of the section curves, one point Pk$_2$ is adopted or selected as a point on the cutting path Pak for cutting the complex curved surface using the vertical-relationship data $$COM1 = CUT, SS1$$
$$COMP, SS2, A$$

obtained at step 205. The cutting pass Pak comprising a sequence of these points is obtained in similar fashion (step 206).

Next, it is determined whether the cutting pass Pak is the final cutting path (step 207). If it is not the final cutting path, the following operation is performed (step 208):

$$k \leftarrow k+1$$

and processing from step 204 onward is repeated to generate the complex curved surface SS as a set of the cutting paths Pak. If the cutting pass is the final pass, processing for generating the cutting passes of the complex curved surface is terminated.

In accordance with the present invention as described above, a complex curved surface is divided into a plurality of areas, a vertical relationship regarding curved surfaces is specified for every area. The vertical relationship conforms to an area in which a cutting pass exists is used to obtain cutting passes of the complex curved surface in this area. The cutting passes of the complex curved surface are obtained by combining the cutting passes of all areas. As a result, the complex curved surface can be generated in simple fashion without taking into consideration the vertical relationship of curved surfaces that have no bearing upon cutting passes. This makes it possible to shorten the processing time needed for generating the cutting passes.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of generating cutting passes of a complex curved surface comprising the steps of:
    (a) specifying a plurality of input curved surfaces constituting the complex curved surface, a vertical relationship among these input curved surfaces and a cutting pass on a reference plane;
    (b) adopting, from among projected points obtained when a point on the cutting pass is projected onto each of the input curved surfaces, one of the projected points determined by said vertical relationship as a point on a cutting pass for cutting the complex curved surface;
    (c) dividing the complex curved surface into areas and specifying vertical relationships of only the input curved surfaces in each of the areas;
    (d) obtaining cutting passes of the complex curved surface in each of the areas by using the vertical relationships of said areas; and
    (e) obtaining cutting passes of the complex curved surface by combining the cutting passes of all of the areas; and
    (f) machining a workpiece based on the cutting passes obtained.

2. A method of generating cutting passes of a complex curved surface according to claim 1, wherein said dividing is performed by specifying the areas with partitioning lines on said reference plane.

3. A method of generating cutting passes of a complex curved surface according to claim 2, further comprising the steps of:
    obtaining an area in which a cutting pass on the reference plane is obtained, projecting a point on said cutting pass onto each of the input curved surfaces in said area to obtain projected points; and selecting, from among the projected points, a point determined by the vertical relationship of said area as a point on a cutting pass of the complex curved surface.

4. A method of generating cutting passes of a complex curved surface defined by combining input curved surfaces, comprising the steps of:
    (a) partitioning the complex curved surface into areas;
    (b) specifying, for each of the areas, only those of the multiple surfaces within each of the areas;
    (c) creating cutting passes upon each of the areas based on a vertical relationship between the multiple surfaces specified;
    (d) combining all of the cutting passes performed upon each of the areas to generate all of the cutting passes of the complex curved surface; and
    (e) machining a workpiece based on the cutting passes generated.

5. A method according to claim 4, wherein the cutting passes in step (c) are created by the steps of:
    (c1) intersecting the input curved surfaces with a specified number of vertical planes, and
    (c2) designating a highest point of intersection to be a point on each of the cutting passes.

6. A method of generating cutting passes of a complex curved surface defined by combining input curved surfaces according to claim 5, wherein the specified number of vertical planes in step (c1) are specified by the steps of:
    (c1a) designating a line of intersection on a reference plane that is to be the line of intersection of a first of the vertical planes used to form a first of the cutting passes;
    (c1b) designating a number of lines of intersection; and
    (c1c) designating a distance between each of the lines of intersection to thereby define a location of each cutting pass.

7. A method according to claim 6, wherein the partitioning in step (a) is obtained by a step of specifying partitioning lines on the reference plane, said partitioning lines representing a line of intersection between the vertical planes partitioning the complex curved surface and the reference plane.

8. A method according to claim 6, wherein each of the cutting passes in step (c) creates a section curve by vertically projecting, from the reference plane, projection points on an intersection of each of the vertical planes with one of the input curved surfaces; and selecting as a point on the section curve one of the projection points having a greatest vertical distance from the reference plane.

9. An automatic programming apparatus for generating cutting passes of a complex curved surface defined by combining input curved surfaces, comprising:

a memory, storing data defining the input curved surfaces;

cutting pass location data entry means for entering data defining a location of a first cutting pass and a number of and distance between the remaining passes;

partition data entry means for entering data defining a location of partition lines partitioning the complex input curved surfaces into areas;

input curved surface data entry means for entering data defining only the input curved surfaces present within each of the different areas; and a processor, operatively connected to said memory, said cutting pass location data entry means, said partition data entry means and said input curved surface data entry means, creating cutting passes within each of the areas and combining the cutting passes from all of the areas to generate the cutting passes of the complex curved surface for use in machining a workpiece.

10. An automatic programming apparatus according to claim 9, wherein the processor obtains cutting passes by combining all of the cutting passes created for each of the areas to generate all of the cutting passes of the complex curved surface.

* * * * *